United States Patent [19]

Werner et al.

[11] 4,166,560
[45] Sep. 4, 1979

[54] CARGO CARRIER FOR MOTOR VEHICLES

[76] Inventors: Lothar Werner, Marxstrasse 9, 7560 Gaggenau-Ottenau; Siegfried Milke, Neptunstrasse 6, 7550 Rastatt 17, both of Fed. Rep. of Germany

[21] Appl. No.: 843,846

[22] Filed: Oct. 20, 1977

[51] Int. Cl.² .................................................. B60R 9/04
[52] U.S. Cl. ............................. 224/42.1 F; 211/60 SK
[58] Field of Search ................. 224/42.1 R, 42.1 D, 224/42.1 E, 42.1 F, 42.1 G, 29 R; 70/58, 38 R, 38 A, 38 B, 38 C; 211/60 SK; 280/179 R, 179 A, 179 B

[56] References Cited

U.S. PATENT DOCUMENTS

| | | | |
|---|---|---|---|
| 2,833,453 | 5/1958 | Barreca | 224/42.1 F |
| 3,325,069 | 6/1967 | Fulton | 224/42.1 F |
| 3,348,747 | 10/1967 | Vuarchex | 224/42.1 F |
| 3,622,057 | 11/1971 | Marker | 224/42.1 F |
| 3,710,998 | 1/1973 | Marker | 224/42.1 F |
| 3,897,895 | 8/1975 | Read | 224/42.1 F X |
| 3,920,167 | 11/1975 | Parsons | 224/42.1 F |
| 4,064,716 | 12/1977 | Shwayder et al. | 70/38 A |

FOREIGN PATENT DOCUMENTS 1158913  9/1956  France ............................. 224/42.1 E

*Primary Examiner*—Stephen G. Kunin
*Assistant Examiner*—Winston H. Douglas
*Attorney, Agent, or Firm*—Bacon & Thomas

[57] ABSTRACT

An inverted U-shaped hollow rectangular tube has clamps at its ends for securing the same to the rain gutter of a vehicle. Openings in the tube removably receive selected load supports and a slide bar in the tube engages the load support to prevent its removal. Locks prevent release of the slide bar and cover the clamps to prevent their unauthorized release.

7 Claims, 6 Drawing Figures

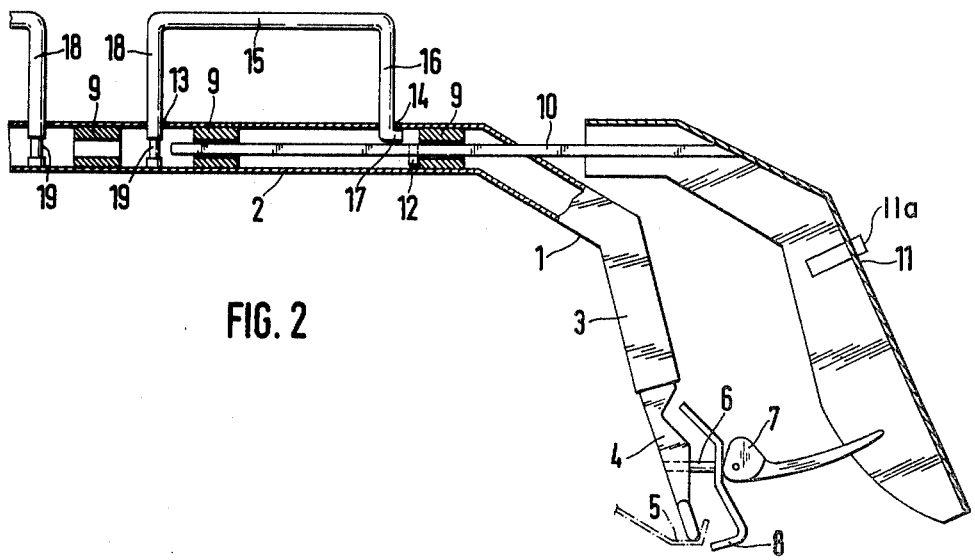
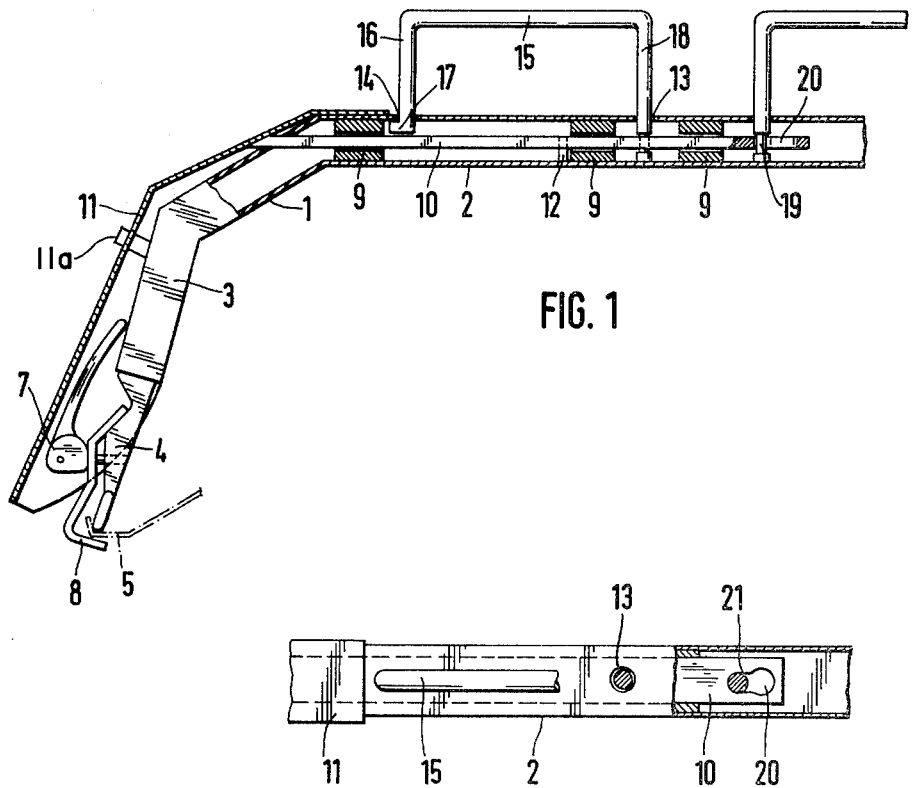

CARGO CARRIER FOR MOTOR VEHICLES

The invention relates to a roof load support for motor vehicles consisting of a bow-shaped rectangular tube.

Known prior art roof load supports are provided for a specific purpose and may be used, for example, as ski holders, or boat holders, or as luggage frame. Consequently, a separate roof load support is required for each purpose. Moreover, the protection of the roof load support from theft is not solved to a satisfactory extent in the case of the prior art arrangements.

It is the object of the invention to provide a roof load support which is usable for all possible purposes and is lockable in a burglarproof manner.

According to the invention this object is solved in that the upper straight cross-bar of the rectangular tube comprises receptacles for load holders, that, at least, one lock bar is guided in the cross-bar, which can be brought into positive engagement with the load holders, and that the lock bar can be locked in the rectangular tube.

As a further development the invention proposes that there is arranged in the end region of the rectangular tube a roofdrip molding or gutter clamp adapted to be tightened by an eccentric lever, and that a closing shell provided on the lock bar overlaps the end arm of the rectangular tube and, thus, the roofdrip molding clamp.

By this configuration of the roof load support the load holders are held by the lock bar in a theftproof manner. In addition, by the closing shell provided on the lock bar also the roofdrip molding clamp is secured so that the roof load support is secured against unwarranted removal. The load holders may be provided as ski holders, as boat holders, as holders for a luggage frame or for a basket holder or also in any other manner. The roof load support may comprise one bow-shaped tube arrangement or a plurality of bow-shaped tube arrangements so that it is possible to adapt the roof load support to the specific application.

Further features of the invention are set forth in the claims.

The invention will be described with reference to the attached drawing.

FIG. 1 is a view of half a bow-shaped rectangular tube of a roof load support, in section, and in the locked condition;

FIG. 2 is a corresponding view in the unlocked condition;

FIG. 3 is a top view of a portion of FIG. 1;

Figure 5:
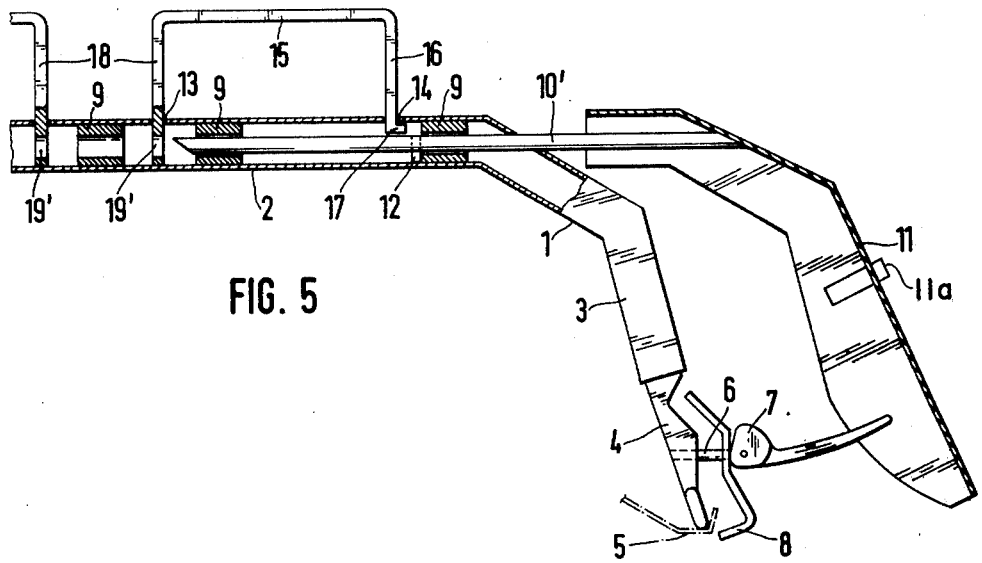
FIG. 5 is a corresponding view similar to FIG. 2.

The roof load support comprises a bow-shapedly bent rectangular tube 1, the right-hand and left-hand end portions of which are illustrated in FIGS. 1 and 2. The rectangular tube comprises an upper straight cross-bar 2 as well as bent arms 3, each receiving a support leg 4 which can be placed into the roofdrip molding or gutter 5 of a motor vehicle roof in the manner as illustrated. On the support leg 4 there is a member 6, upon which an eccentric lever 7 is pivoted.

The cross-bar 2 of the roof load support, preferably, consists of rectangular tubes, inserted into each other in a telescope-like manner in order to be able to adjust the roof load support to the specific width of the roof. This is not illustrated in the Figures. Within the cross-bar 2 there are, between the two ends, guiding elements 9 for band-shaped locking bars 10, each of which laterally extends from the arm 3. On the locking bar 10 there is a channel-shaped closing shell 11 which covers the arm 3 and clamp 7-8 when the locking bar is in its inner position. The closing shell 11 may receive a lock, for example, a cylinder lock schematically shown at 11a, which engages the arm 3 and is lockable there. On the locking bar 10 there is an abutment 12 which cooperates with the guiding elements 9 to provide a stop for the locking bar 10.

The upper wall of the cross-bar 2 has recesses or openings 13, 14 arranged in pairs, each being designed for a U-shaped bow 15 which is of wire and has approximately a round cross section. An arm 16 of the bow or of the load holder 15 has a bent projection 17. The other arm 18 is substantially straight and comprises cutouts or neck portions 19.

The locking bar 10 has "keyhole" passages 20 which at one end 21 are narrow and which are dimensioned to receive the cross section of the cutouts 19.

FIG. 2 shows the roof load support in the opened or released condition. The support leg 4 is placed upon the roof drip molding 5. Now the eccentric lever 7 can be turned upwards so that the roofdrip molding clamp 8 is pressed inwardly, as illustrated in FIG. 1. The locking bar 10 is drawn out in the illustration of FIG. 2. In this position the bow 15 with the arm 16 may be inserted into the recess 14 so that the projection 17 is situated in the interior of the cross-bar. The arm 18 is moved into the tube of the cross-bar 2, it being necessary to previously adjust the locking bar 10 according to the passages 20. Finally, the locking bar 10 is moved into the position shown in FIG. 1 so that thereby the narrow ends 21 of the passages 20 engage the cutouts 19 of the arms 18. Thus, the bows 15 are locked so that they cannot be taken out. The closing shell 11 covers the eccentric lever 7 so that the same cannot be opened. By a lock, or in any other manner, it is possible to lock the locking bar 10 or the closing shell 11, respectively, on the arm 3 of the cross-bar 2. Thereby the roof load support is blocked so that an unauthorized release is not possible.

The bows 15 may serve directly as holders for skis. In this case one requires two cross-bars for the receiving and holding of skis. The bows 15 may carry also attachments for the holding of a boat. Furthermore, a luggage frame, a basket carrier, or a closed case may be put upon the bows. In each case locking is possible in the manner as described.

Figure 4:
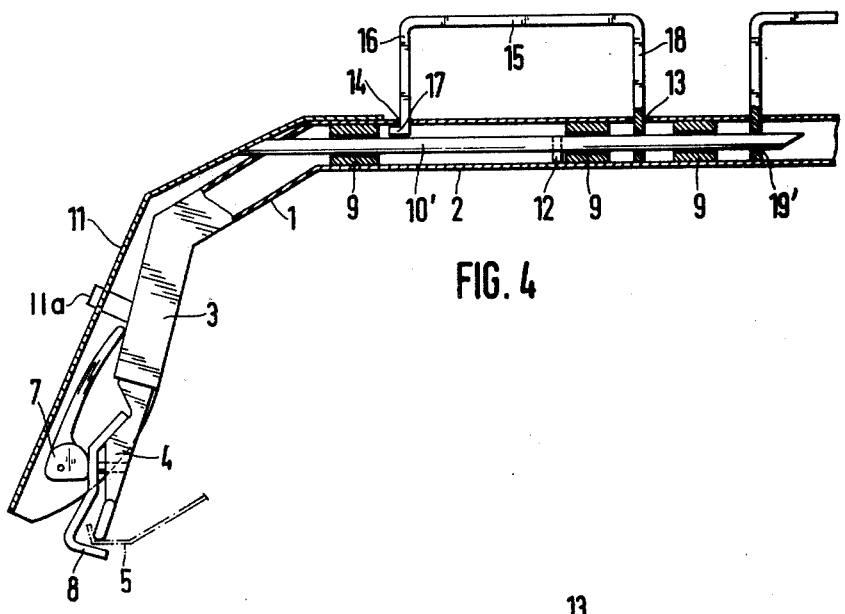
FIG. 4 is a view, corresponding to FIG. 1, of a modified embodiment of the invention.
Figure 6:
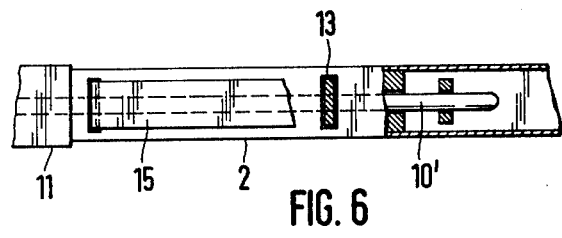
FIG. 6 is a top view of a portion of FIG. 4.

FIGS. 4 to 6 show a further embodiment of the invention with the following modifications in regard to the embodiment as described above. The locking bar 10' is of a rod-like structure and has a round cross section. The front end of the locking bar 10' is tapered. The bows 15 are of a band-shape. In the arms 18 passages 19' for the specific locking bar 10' are provided.

The function of this embodiment of the invention corresponds with the function described above. The locking bar 10' extends in each case through the passages 19' of the bows 15 and thereby locks the bows.

We claim:

1. A roof load support for motor vehicles having a tube of rectangular cross section having a straight upper portion and legs depending from the ends thereof;

said upper portion having spaced openings therein;

an inverted U-shaped load holder, the legs of which extend into said openings, the end of one of said legs being bent laterally within said tube;

a lock bar longitudinally slidable in and projecting from an end of said upper portion and having means slidably projectable into locking engagement with the other leg of said load holder, within said upper portion, to prevent withdrawal of said load holder from said openings.

2. A load support as defined in claim 1 wherein said legs of said tube are provided, adjacent their lower ends with lever-actuated clamp means for clamping the lower ends thereof to the roofdrip molding of a vehicle;

said lock bar having a downwardly extending cover fixed thereon and arranged to cover and conceal said lever-actuated clamp when said lock bar lockingly engages said leg of said load holder.

3. A load support as defined in claim 2 including lock means for locking said cover to said leg.

4. A load support as defined in claim 1 wherein there are two of said lock bars therein, one projecting from each end of said upper portion, and load support receiving openings for two load supports associated with each lock bar.

5. A load support as defined in claim 1 wherein said means engageable with the other leg of said load holder comprises a neck portion on said other leg and a keyhole opening in said lock bar.

6. A load support as defined in claim 1 wherein said means engageable with the other leg of said load holder comprises an opening in said other leg into which an end of said lock bar is insertable.

7. A load support as defined in claim 1 including abutment means in said lock bar and in said tube to limit sliding movement of said lock bar.

* * * * *